US008138950B1

(12) United States Patent
Leung

(10) Patent No.: US 8,138,950 B1
(45) Date of Patent: Mar. 20, 2012

(54) PROGRAMMABLE PARKING METER AND INTEGRATED PAGING TRANSMITTER

(75) Inventor: Fee Chan Leung, Hazlet, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 338 days.

(21) Appl. No.: 12/462,060

(22) Filed: Jul. 24, 2009

(51) Int. Cl.
*B60Q 1/48* (2006.01)

(52) U.S. Cl. ............. 340/932.2; 340/286.02; 340/539.1; 340/539.11; 705/13; 705/418; 235/382; 235/384

(58) Field of Classification Search ............... 340/539.1, 340/539.11; 235/384, 375; 705/382, 384
See application file for complete search history.

(56) References Cited

U.S. PATENT DOCUMENTS

| | | | | |
|---|---|---|---|---|
| 6,344,806 | B1 * | 2/2002 | Katz | 340/932.2 |
| 6,889,899 | B2 * | 5/2005 | Silberberg | 235/384 |
| 2003/0132840 | A1 * | 7/2003 | Bahar | 340/541 |
| 2006/0139182 | A1 * | 6/2006 | Staniszewski | 340/932.2 |
| 2007/0188349 | A1 * | 8/2007 | Staniszewski | 340/932.2 |

\* cited by examiner

*Primary Examiner* — Daryl Pope
(74) *Attorney, Agent, or Firm* — Michael Zelenka; Stephen J. Harbulak

(57) ABSTRACT

A programmable parking meter and integrated paging transmitter is provided to warn the parking patron with a pre-violation notice that the parking time is about to expire. The programmable parking meter and integrated paging transmitter includes a rechargeable battery, a flat display that provides programming options and status of parking information to the parking patron, coin slots for use as a conventional coin operated parking meter, an automated teller machine (ATM) style keyboard to activate and program the paging apparatus, and a paging transmitter to interface with existing digital relays and infrastructure for personal communications devices. The invention also includes a method for notifying a remote parking patron that a programmable parking meter and integrated paging transmitter is scheduled to expire.

16 Claims, 2 Drawing Sheets

PROGRAMMABLE PARKING METER AND INTEGRATED PAGING TRANSMITTER

GOVERNMENT INTEREST

The invention described herein may be manufactured, used, imported, sold, and licensed by or for the Government of the United States of America without the payment to me of any royalty thereon.

FIELD OF THE INVENTION

The present invention relates generally to the field of parking fee collection devices and apparatus. More particularly, the present invention relates to programmable parking meter and paging devices.

BACKGROUND OF THE INVENTION

Parking meters have been used extensively in this country and around the world in an effort to alleviate parking problems in congested urban areas. The first parking meters were installed in Oklahoma City, Okla. because downtown workers parked on downtown streets all day, and left no parking spaces for shoppers and visitors to the central business district. Soon the municipalities learned that charging a parking fee could also generate revenue for the town coffers. From that early beginning, the use of parking meters by municipalities, colleges and universities, and private parking facilities has increased to the point that, in the United States today, millions of parking meters are currently in use.

The first parking meters were mechanical and powered by a clock-type mainspring, which required periodic winding, maintenance, coin collection, and so on. Honor-based systems have also been widely used, such as giving the patron an envelope for the parking fee. Honor-based systems are inexpensive to install and do not require electrical power. However, these honor systems suffer from the disadvantage of not having any verification methods and they may be abused by a dishonest person. Other prior art parking fee collection systems have employed an unattended payment station where the parking patron deposits the required fee in an armored box, or perhaps an armored box with a numbered slot corresponding to a numbered parking spot. One problem with prior art armored box systems is that they require manpower to travel to the collection box, empty the collection box, and count the deposited money to ensure that the patron has paid for the occupied parking space. Such armored box systems could readily be abused by an inaccurate or dishonest coin collection. And requiring the coin collector to travel to multiple collection boxes may also include the risk of robbery. Recently, industry has also developed a number of sophisticated electrical or electronic parking meters that perform numerous functions such as accepting credit cards or smart cards, calculating the parking fee, issuing a receipt, printing a parking ticket in the case of overdue payment, and sensing whether the parking space is still occupied. Yet, prior art parking systems still suffer from a number of shortcomings, limitations, and disadvantages.

Despite these advances in parking meter technology, collection and enforcement of the parking fee is still a time-consuming and labor-intensive necessity for any parking system. The time-consuming and labor-intensive enforcement activity usually takes place after the parking fee is overdue and the parking violation has already taken place. Current parking fee collection systems cannot notify the parking patron that the purchased time period will lapse, unless the patron stands nearby the parking meter and views the available time on the parking meter. There is no currently available parking system that notifies the parking patron that the purchased parking time will expire before the parking violation takes place. Thus, there has been a long-felt need for a parking system that alleviates the shortcomings, limitations, and disadvantages of parking fee collection and enforcement by providing the parking patron with a pre-violation overdue notice.

SUMMARY OF THE INVENTION

In order to fulfill the long-felt need for a parking system that alleviates the shortcomings, limitations, and disadvantages of current parking system fee collection and enforcement with a pre-violation warning notice, this invention provides a systematic approach for notifying the remote parking patron that the purchased time period is about to lapse and that an additional parking fee is required with a programmable parking meter and integrated paging transmitter. In accordance with the present invention's programmable parking meter and integrated paging transmitter, the device notifies the remote parking patron, before the parking violation occurs that the purchased parking time is scheduled to expire with a pager apparatus allowing the patron can add the necessary further payment. In accordance with the present invention, the parking space operator can now avoid the shortcomings and disadvantages of collection and enforcement of prior art parking systems, and the parking patron can now avoid needlessly paying for parking violations, or in the worst case, having the vehicle towed.

It is an object of the present invention to provide a programmable parking meter and integrated paging transmitter.

Another object of the present invention to provide a programmable parking meter and integrated paging transmitter that notifies a remote parking patron that the parking meter is about to expire.

Yet another object of the present invention is a method for notifying a remote parking patron that the parking meter is about to expire with a programmable parking meter and integrated paging transmitter.

These and other objects are advantageously accomplished with the present invention by providing a programmable parking meter and integrated paging transmitter comprising a rechargeable battery, a flat display that provides programming options and status of parking information to the parking patron, coin slots for use as a conventional coin operated parking meter, an automated teller machine (ATM) style keyboard to activate and program the paging apparatus, and a paging transmitter to interface with existing digital relays and infrastructure for personal communications devices. To avoid the additional expense of providing new mounting poles and hardware, the programmable parking meter and integrated paging transmitter is configured to be mounted onto standard parking meter mounts.

DETAILED DESCRIPTION OF THE DRAWINGS

The present invention is a programmable parking meter and integrated paging transmitter configured to answer the long-felt need for a parking system that can avoid overdue charges and fines by notifying the parking patron that time will expire before the parking violation takes place. This invention's innovative pre-violation notice to the parking patron should reduce the number of parking violations, prevent having the vehicle booted or towed, and relieve downtown congestion by reminding the patron to either pay the additional parking fee or leaving the parking space.

Figure 1:
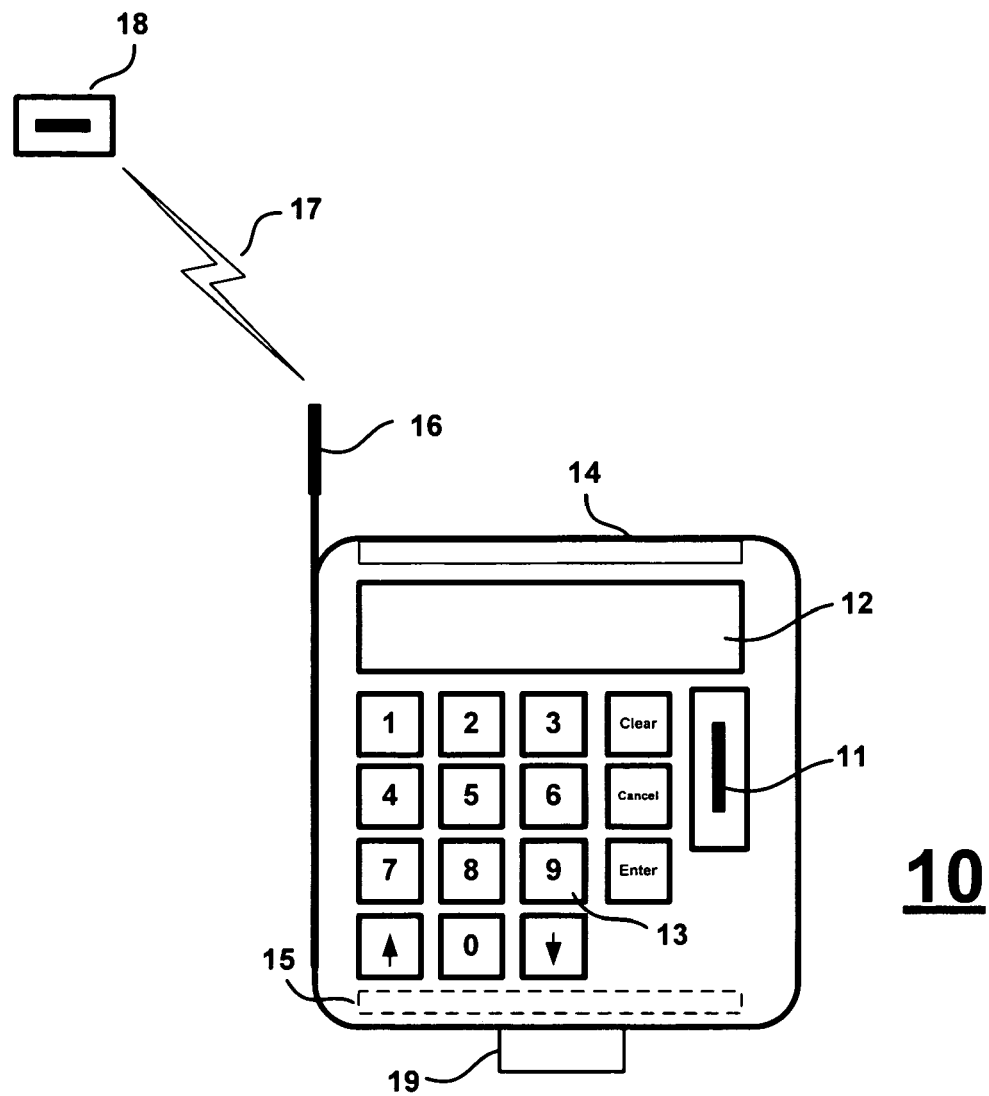
FIG. 1 is a frontal conceptual view of this invention's programmable parking meter and integrated paging transmitter.

Referring now to FIG. 1, there is depicted this invention's programmable parking meter and integrated paging transmitter device 10, comprising a coin slot 11, flat display 12, keypad 13, and photocells 14. The coin slot 11 allows the patron to deposit the parking fee whether the device 10 is to be used as a standard parking meter or as a programmable meter with pre-violation notice capability. Once the parking fee is deposited, the flat panel display 12 asks the parking patron to press Enter if the patron decides to take advantage of the programmable and pre-violation notice capability, which is available at an additional cost. Then, the flat panel display 12 will instruct the parking patron on how to enter the patron's pager number into the device 10 and notify the patron when the time is about to expire.

The programmable parking meter and integrated paging transmitter device 10 is powered by a rechargeable battery and a photocell 14 that uses sunlight and street lights to generate electricity in order to charge the battery. The programmable parking meter and integrated paging transmitter includes a paging transmitter 15, represented by broken lined box 15, inside the device 10 that is compatible with existing commercial cellular telephone and pager networks and infrastructure. The paging transmitter is connected to a rugged vandal-resistant antenna 16, which transmits a signal 17 to the pager device, represented by box 18, to notify the parking patron that the time is about to expire. The programmable parking meter and pager device 10 also includes a standard meter mount fixture 19 designed to fit onto existing parking meter poles.

Variations of the present invention include configuring the flat display 12 to provide additional programming options, such as how much advance notice is needed, as well as the status of parking information, configuring the paging transmitter 15 to seamlessly interface with existing digital relays and infrastructure for personal communications devices to include not only pagers, but cellular phones, PDA devices, and so on.

Figure 2:
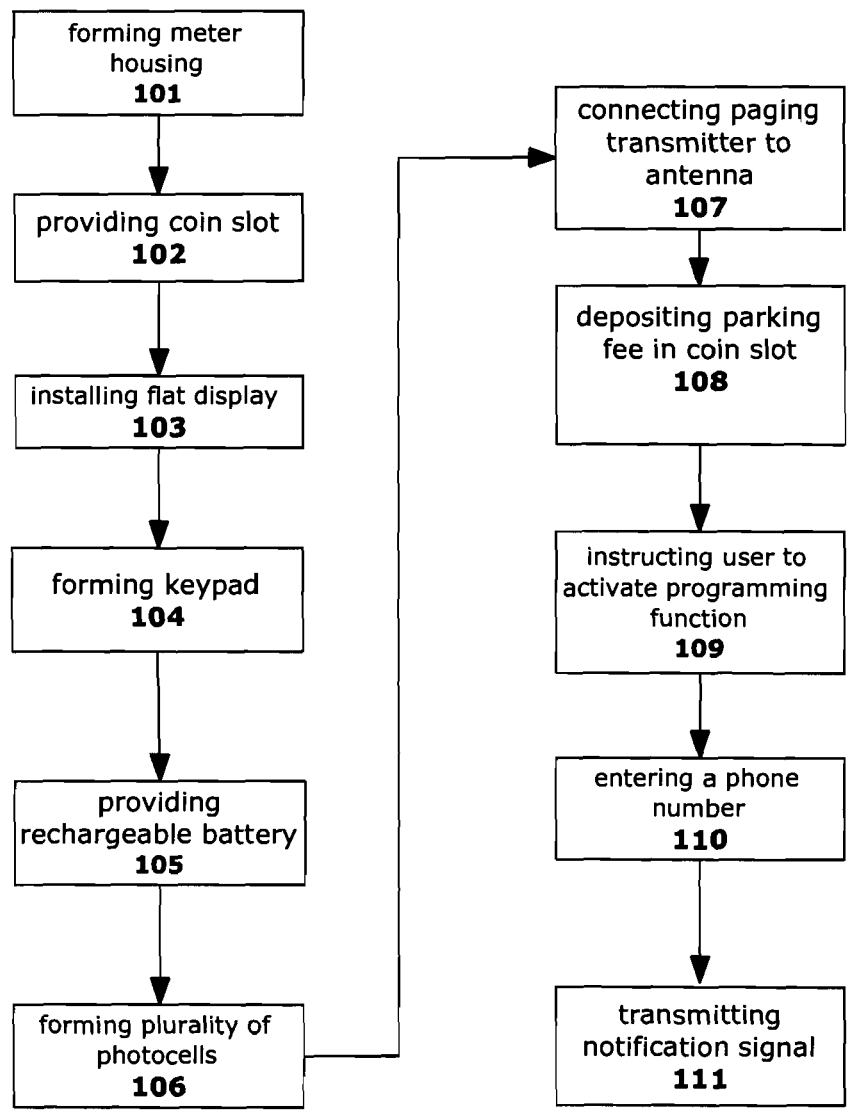
FIG. 2 is a flow diagram depicting the steps of this invention's method for notifying a remote parking patron that a programmable parking meter and integrated paging transmitter is scheduled to expire.

Referring now to FIG. 2, this invention also encompasses a method for notifying a remote parking patron that a programmable parking meter and integrated paging transmitter is scheduled to expire, comprising the steps of forming a meter housing 101; providing a coin slot on the meter housing 102; installing a flat display on the meter housing 103; forming a keypad on the meter housing 104; providing a rechargeable battery 105; and forming a plurality of photocells on the meter housing 106. The steps of the method continue with the steps of connecting a paging transmitter to an antenna 107; depositing a parking fee in the coin slot for a given amount of parking time 108; instructing the user to activate a programming function by pressing a sequence of buttons on the keypad with a set of instructions on the flat panel display 109; entering a phone number the keypad for a pre-violation notification to be sent to a communication device of the user at a predetermined warning period before the given amount of parking time expires 110; and transmitting a notification signal from the pager transmitter to the communication device when the predetermined warning period has expired allowing the user to deposit an additional parking fee before the given amount of time expires 111. Many of the variations of the device embodiment also apply to the method of this invention.

It will be understood that the embodiments described herein are merely exemplary and that a person skilled in the art may make many variations and modifications to the described embodiments utilizing functionally equivalent elements to those described. Any variations or modifications to the invention just described are intended to be included within the scope of said invention as defined by the appended claims.

What I claim is:

1. A programmable parking meter and an integrated paging transmitter, comprising:
    a coin slot;
    a flat display;
    a numeric keypad;
    a rechargeable battery and a plurality of photocells;
    a paging transmitter is connected to an antenna;
    after a parking fee is deposited in said coin slot for a given amount of parking time, said flat panel display without any intervening communication instructs the user to activate a programming function by pressing a sequence of buttons on said keypad;
    said flat panel display instructs the user to enter a phone number on said numeric keypad for a pre-violation notification to be sent directly to a communication device of the user without any intervening communication at a predetermined warning period before said given amount of parking time expires; and
    said paging transmitter transmits a notification signal directly to said communication device when said predetermined warning period has been reached, allowing the user to deposit an additional parking fee before said given amount of time expires.

2. The programmable parking meter and the integrated paging transmitter, as recited in claim 1, further comprising the user can choose no programming by ignoring said flat panel display.

3. The programmable parking meter and the integrated paging transmitter, as recited in claim 2, further comprising:
    said photocell generates electricity from sunlight and other ambient light; and
    said photocell charges said rechargeable battery.

4. The programmable parking meter and the integrated paging transmitter, as recited in claim 3, further comprising said antenna being a rugged vandal-resistant antenna.

5. The programmable parking meter and the integrated paging transmitter, as recited in claim 4, further comprising a standard meter mounting fixture designed to fit onto a plurality of existing parking meter poles.

6. The programmable parking meter and the integrated paging transmitter, as recited in claim 5, further comprising said paging transmitter being compatible with existing commercial communications networks and infrastructure.

7. The programmable parking meter and the integrated paging transmitter, as recited in claim 6, further comprising said communications device being a pager.

8. The programmable parking meter and the integrated paging transmitter, as recited in claim 6, further comprising said communications device being a cellular telephone.

9. A method for notifying a remote parking patron that a programmable parking meter and integrated paging transmitter is scheduled to expire, comprising the steps of:
    forming a meter housing;
    providing a coin slot on said meter housing;
    installing a flat display on said meter housing;
    forming a numeric keypad on said meter housing;

providing a rechargeable battery;

forming a plurality of photocells on said meter housing;

connecting a paging transmitter to an antenna;

depositing a parking fee in said coin slot for a given amount of parking time;

instructing the user without any intervening communication to activate a programming function by pressing a sequence of buttons on said numeric keypad with a set of instructions on said flat panel display;

entering a phone number on said keypad for a pre-violation notification to be sent directly to a communication device of the user without any intervening communication at a predetermined amount of time before said given amount of parking time expires; and transmitting a notification signal from said pager transmitter directly to said communication device when said predetermined amount of time has expired allowing the user to deposit an additional parking fee before said given amount of time expires.

10. The method for notifying the remote parking patron that the programmable parking meter and integrated paging transmitter is scheduled to expire, as recited in claim 9, further comprising the step of allowing the user to choose no programming by ignoring said flat panel display.

11. The method for notifying the remote parking patron that the programmable parking meter and integrated paging transmitter is scheduled to expire, as recited in claim 10, further comprising the steps of:

generating electricity with said photocell; and charging said rechargeable battery with said photocell.

12. The method for notifying the remote parking patron that the programmable parking meter and integrated paging transmitter is scheduled to expire, as recited in claim 11, wherein said antenna is a rugged vandal-resistant antenna.

13. The method for notifying the remote parking patron that the programmable parking meter and integrated paging transmitter is scheduled to expire, as recited in claim 12, further comprising the step of providing a standard meter mounting fixture designed to fit onto a plurality of existing parking meter poles.

14. The method for notifying the remote parking patron that the programmable parking meter and integrated paging transmitter is scheduled to expire, as recited in claim 13, further comprising the step of configuring said paging transmitter to be compatible with existing commercial communications networks and infrastructure.

15. The method for notifying the remote parking patron that the programmable parking meter and integrated paging transmitter is scheduled to expire, as recited in claim 14, wherein said communications device is a pager.

16. The method for notifying the remote parking patron that the programmable parking meter and integrated paging transmitter is, scheduled to expire, as recited in claim 14, wherein said communications device is a cellular telephone.

* * * * *